United States Patent [19]

Giugiaro et al.

[11] 4,353,588
[45] Oct. 12, 1982

[54] OBJECT-HOLDING TRAY FOR MOTOR VEHICLES

[75] Inventors: Giorgetto Giugiaro; Aldo Mantovani, both of Turin, Italy

[73] Assignee: Fiat Auto S.p.A., Turin, Italy

[21] Appl. No.: 158,093

[22] Filed: Jun. 10, 1980

[30] Foreign Application Priority Data

Aug. 21, 1979 [IT] Italy ............................. 53522/79[U]

[51] Int. Cl.³ .............................................. B60R 5/00
[52] U.S. Cl. .................................... 296/37.1; 108/95; 180/90; 296/37.12
[58] Field of Search ................... 296/37.1, 37.8, 37.12; 280/749; 180/90; 108/95; 312/297

[56] References Cited

U.S. PATENT DOCUMENTS

| | | | |
|---|---|---|---|
| 2,588,706 | 3/1952 | Davis | 108/45 |
| 2,626,194 | 1/1953 | Clower | 108/45 |
| 3,936,113 | 2/1976 | Anderson | 312/297 |
| 4,092,008 | 5/1978 | Fetter | 108/45 |

FOREIGN PATENT DOCUMENTS 188932 11/1922 United Kingdom ................. 296/37

Primary Examiner—Joseph F. Peters, Jr.
Assistant Examiner—John A. Carroll
Attorney, Agent, or Firm—Sughrue, Mion, Zinn, Macpeak and Seas

[57] ABSTRACT

A readily accessible object-holding tray for the front of a motor vehicle passenger compartment is formed by a lower portion of a transverse wall of the vehicle body, respective triangular side panels attached to each sidewall of the body, and a flexible base wall. The base wall is secured at each side to the lower edge of a respective side panel and is supported at one edge by a tubular crosspiece extending between the side panels.

5 Claims, 3 Drawing Figures

OBJECT-HOLDING TRAY FOR MOTOR VEHICLES

The present invention relates to a motor vehicle body having a passenger compartment defined by two side walls, and a front transverse wall which icludes a substantially L-shaped part with an upper portion inclind upwardly to the base of the vehicle windscreen and a lower portion inclined downwardly towards the front of the vehicle.

The object of the present invention is to provide a motor vehicle body of the aforesaid type in which the transverse front wall forms an object-holding tray which is readily accessible to the occupants of the front seats of the vehicle, is simple to manufacture and has an aesthetically pleasing appearance.

Accordingly, the present invention provides a motor vehicle body of the aforesaid type, characterised in that the lower portion of the transverse wall forms one wall of an object-holding tray extending across the interior of the vehicle body, the other walls of the tray comprising respective side panels secured to the side walls of the body, and a base wall which is supported at one edge by a crosspiece extending between the side panels, and is secured at each side to the lower edge of a respective side panel.

One embodiment of the present invention will now be more particularly described, by way of example, with reference to the accompanying drawings, in which.

Figure 1:
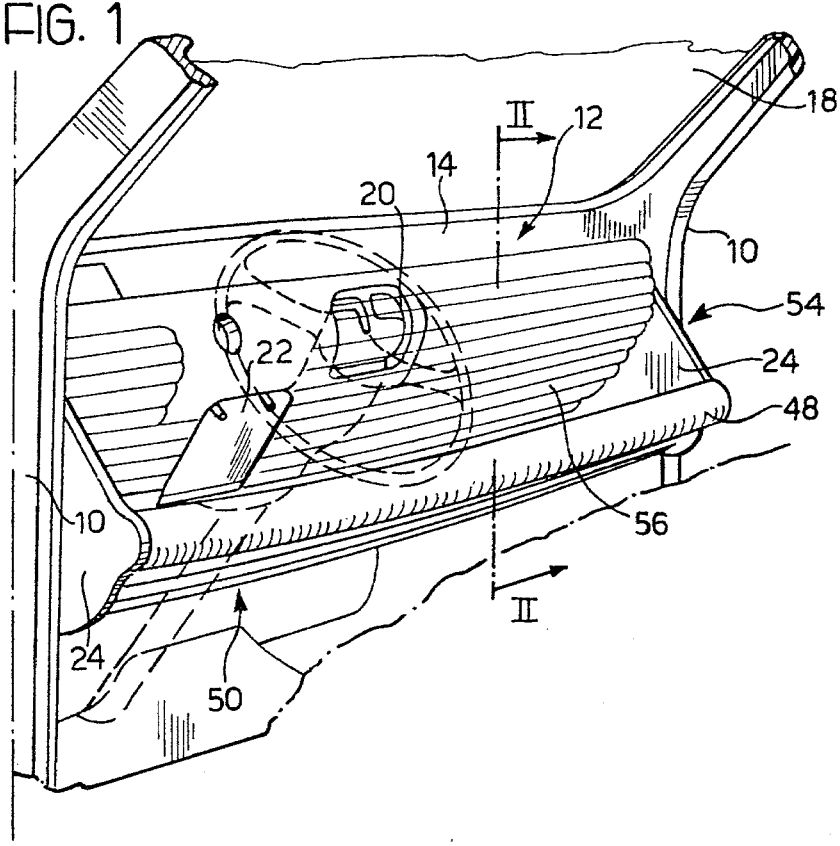
FIG. 1 is a diagrammatic and fragmentary perspective view of the front part of the interior of a motor vehicle body according to the invention.

Referring now the drawings, FIG. 1 shows the front part of the interior motor vehicle body wich has a passenger compartment defined by a pair of side walls 10, and a transverse frontal wall, a part 12 of which has a substantially L-shaped cross section. The L-shaped part 12 comprises an upper portion 14, which is inclined upwardly towards the front of the vehicle to form at its upper edge a seat 16 for the lower edge of the vehicle windscreen 18, and a lower portion 20 which is inclined downwardly towards the front of the vehicle and serves in its upper part as an instrument-bearing dashboard. The lower portion 20 is also provided with an attachment 22 which, as known per se, supports the steering column of the vehicle. Two side panels, generally indicated 24, are secured to the inner faces of the side walls 10 of the vehicle adjacent the side edges of the lower portion 20.

Figure 3:
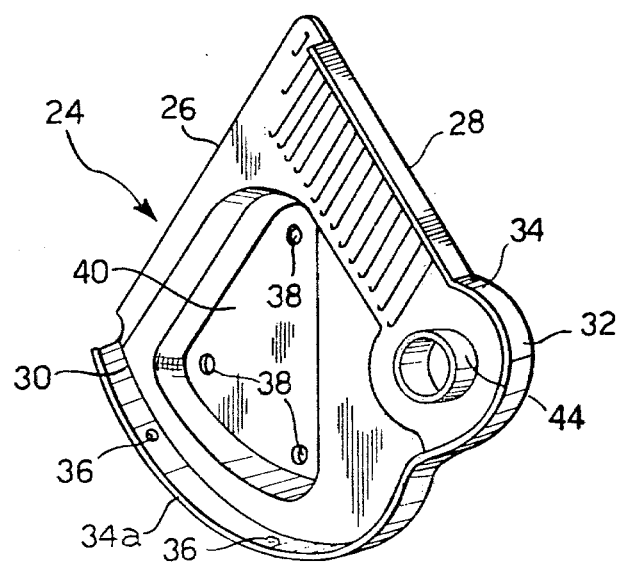
FIG. 3 is a perspective view of a detail of FIGS. 1 and 2.
Figure 2:
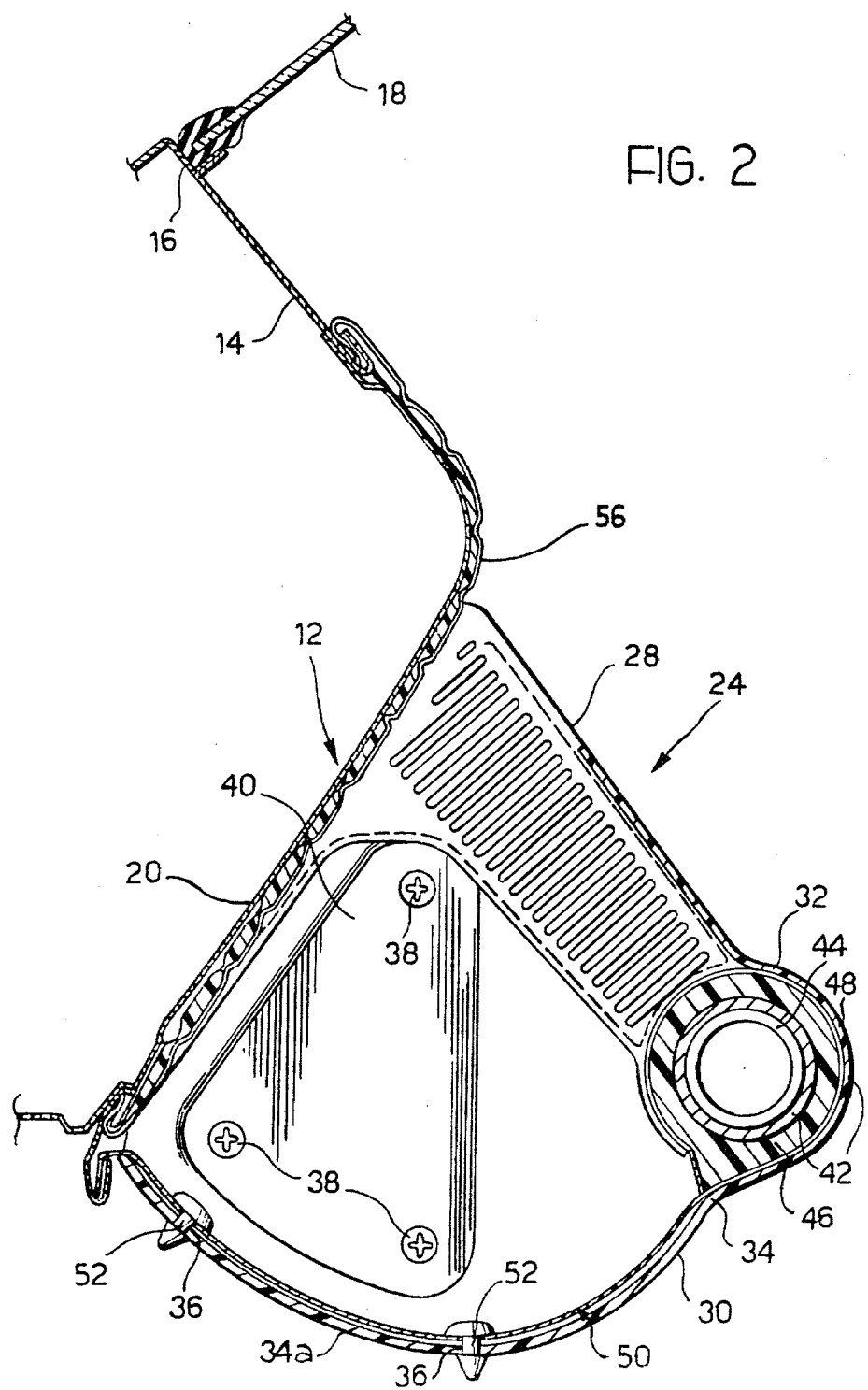
FIG. 2 is a transverse sectional view, on an enlarged scale, taken along the line II—II of FIG. 1.

As is shown in more detail in FIGS. 2 and 3, each side panel 24 has a substantially sector-shaped profile defined by a first flat side 26 which is parallel to the adjacent edge of the lower wall portion 20, a second flat side 28 which is inclined downwardly towards the rear of the vehicle from the upper end of the first flat side 26, and an arcuately curved side 30 interconnecting the lower ends of the first and second flat sides 26, 28. The junction between the second flat side 28 and the curved side 30 is formed with a semicircular projection 32. The second flat side 28, the projection 32 and the curved side 30 of each side panel 24 has an edge flange 34 projecting towards the other side panel 24. The curved portion 34a of the flange 34 along the curved side 30 is provided with two through holes 36.

Each side panel 24 is secured to the respective side wall 10 of the vehicle body by three screws 38 which pass through cooperating holes made through a substantially triangular depressed central portion 40 of the side panel 24 (FIG. 3).

A tubular crosspiece 42 extends perpendicularly to the longitudinal axis of the vehicle, between the two side panels 24, each end of the crosspiece 42 engaging a respective tubular support 44 carried by each side panel 24 concentrically with the respective projection 32. Preferably, the side panels 24 are made from plastics, and the tubular supports 44 may be moulded integrally therewith.

The crosspiece 42 is covered over its entire length by a tubular member 46 of soft material (FIG. 2), and supports a cooperatingly-shaped edge 48 of a flexible plate 50, which extends between the two side panels 24 and has a width substantially equal to the length of the curved sides 30 thereof. The flexible plate 50 is secured at its side edges to the curved flange portions 34a of the two side panels 24 by means of rivets 52 which pass through the flexible plate 50 and are snap-engaged in the holes 36.

The lower portion 20 of the transverse wall 12, the side panels 24, and the flexible plate 50 form, respectively, the front wall, the side walls, and the base of an object-holding tray 54 which is readily accessible to the occupants of the front seats (not shown) of the vehicle. In order to improve the aesthetic appearance of the tray 54, the lower wall portion 20 and at least a part of the upper wall portion 14 are covered by a layer of soft material 56.

A motor vehicle body according to the present invention provides an object-holding tray 54 which is functional, has an aesthetically pleasing appearance, and also offers a degree of safety in the event of a frontal collision involving the vehicle.

What is claimed is:

1. In a motor vehicle body having a passenger compartment defined by a pair of side walls, an upper frontal transverse wall portion inclined upwardly to the base of the vehicle windshield, and a lower frontal transverse wall portion inclined downwardly towards the front of said vehicle and cooperating with said upper wall portion to form a substantially L-shaped part of said transverse wall, an object-holding tray which extends across the interior of said vehicle, wherein said tray comprises:

said lower transverse wall portion which defines a wall of said tray;

respective side panels secured to respective said side walls;

a flexible base wall secured at each side to a lower edge of a respective said side panel, and a crosspiece connected to said side panels and extending in spaced-parallel condition with respect to the said lower transverse wall portion, the said crosspiece supporting one edge of said base wall thereby defining an open receptacle spanning the entire width of the said passenger compartment.

2. A motor vehicle body as defined in claim 1, wherein:

each said side panel has a substantially sector-shaped profile defined by a first flat side adjacent and parallel to said lower transverse wall portion, a second flat side inclined downwardly towards the rear of said vehicle from the upper end of said first flat side, and an arcuately curved side interconnecting the lower ends of said first and said second flat sides, said curved side of each said side panel having an edge flange projecting towards the other said panel;

said crosspiece is tubular and engages at each end a respective tubular support carried by each said side panel at the lower end of the respective said second flat side, and said base wall comprises a flexible plate supported at one edge by said crosspiece, and secured at each side to a respective said side panel at said flange of said curved side thereof.

3. A motor vehicle body as defined in claim 2, wherein one edge of said flexible plate surrounds said tubular crosspiece.

4. A motor vehicle body as defined in claim 2, wherein said tubular crosspiece is covered with a soft material.

5. A motor vehicle body as defined in claim 1, wherein said lower transverse wall portion and at least a part of said upper transverse wall portion are covered with a soft material.

* * * * *